United States Patent [19]

Rivera

[11] Patent Number: 4,693,097
[45] Date of Patent: Sep. 15, 1987

[54] PORTABLE CHAIN LOCK

[76] Inventor: Charles A. Rivera, 37849 Birch St., Newark, Calif. 94560

[21] Appl. No.: 271,978

[22] Filed: Jun. 9, 1981

[51] Int. Cl.⁴ .............................................. E05B 73/00
[52] U.S. Cl. .................................... 70/18; 24/68 CT; 24/69 T; 24/116 R; 70/57; 70/61
[58] Field of Search ........................ 70/61, 57, 58, 18; 24/116 R, 68 CD, 68 CT, 69 CT, 69 T; 254/243, 244, 256, 261

[56] References Cited

U.S. PATENT DOCUMENTS

| | | | |
|---|---|---|---|
| 1,082,813 | 12/1913 | McCarthy | 24/116 R |
| 1,274,203 | 7/1918 | Sager | 211/4 |
| 1,395,354 | 11/1921 | Pagelsen | 24/116 R |
| 1,577,292 | 3/1926 | Obreiter | 70/258 |
| 1,797,230 | 3/1931 | Gillet | 24/116 R |
| 2,571,349 | 10/1951 | Eckles | 70/57 X |
| 3,817,064 | 6/1974 | Sallee | 70/58 |
| 3,954,252 | 5/1976 | Lyons | 254/78 |
| 3,974,668 | 8/1976 | McWhorter | 70/14 |
| 3,999,410 | 12/1976 | Hall | 70/58 |
| 4,008,589 | 2/1977 | Harrell | 70/18 X |
| 4,057,983 | 11/1977 | Morgan | 70/58 X |
| 4,062,206 | 12/1977 | McWhorter | 70/14 |
| 4,238,940 | 12/1980 | McWhorter | 70/14 |

FOREIGN PATENT DOCUMENTS

| | | | |
|---|---|---|---|
| 496808 | 4/1930 | Fed. Rep. of Germany | 24/116 R |
| 6538 | of 1913 | United Kingdom | 70/58 |
| 111456 | 11/1917 | United Kingdom | 24/116 R |

Primary Examiner—Robert L. Wolfe
Assistant Examiner—Lloyd A. Gall
Attorney, Agent, or Firm—James G. O'Neill

[57] ABSTRACT

A portable chain lock for a chain binder used to tighten a chain holding a load on a truck flat bed. The portable chain lock has an open body with a pin fixed to a bottom wall and extending outwardly between a pair of sidewalls. One of the sidewalls has the first end of a locking chain fixed thereto while the other sidewall has a holding arm having an opening fixed thereto. The pin is passed through a chain link or other opening in one half of the chain binder when the chain binder is in the tightened position. The locking chain is wrapped around the other half of the chain binder with its second or free end looped over the holding arm and secured to the holding arm by a padlock passed through the opening in the holding arm, to thereby lock the chain binder in the chain tightened position.

1 Claim, 4 Drawing Figures

PORTABLE CHAIN LOCK

BACKGROUND OF THE INVENTION

The present invention relates to a portable lock for use with a chain binder to prevent unauthorized removal of the chain binder.

In the past, arrangements have been suggested for latching or locking chain or load binders, of the so-called overcenter type, in their load tightened position. Overcenter chain binders of the type to be secured with the portable locking device of the present invention generally include two tension elements or halves which are attached to the ends of a pair of chains, or the opposite ends of a single chain. The tension elements are interconnected by a rigid handle which is swung between opened and closed positions, respectively, for releasing and tightening the chains over a load. The tension elements are moved by the operation of the rigid handle, around spaced apart pivotal axes, one of which axes ultimately moves to a slightly overcenter position with respect to the other.

Known latching or locking arrangements for these load binders usually take the form of projecting fingers or spurs formed integrally with the lever arm or first half of the binder, or holes formed in the second or other half of the binder, so that when the two halves of the binder are squeezed together, the integral fingers or holes coact with a lock to hold the two halves securely together. Examples of such structures are shown in U.S. Pat. Nos. 3,954,252; 3,974,668; 4,062,206 and 4,238,940.

SUMMARY OF THE INVENTION

The present invention provides an improved portable locking device primarily for use with any overcenter chain or load binder presently available, or which might become available in the future. The portable locking device may be mounted in any number of positions, depending on the chain binder to be secured, as long as a portion of the locking device coacts with the rigid handle in the load tightened position. A padlock or other type of lock is inserted in the portable locking device to prevent unauthorized removal of the locking device and the chain binder.

To provide the above, the portable locking device comprises a simple, easy to use and inexpensive to manufacture main body having a pin centrally mounted therein. A holding arm having a hasp holding hole formed therein extends away from the pin from one side of the body, and a flexible securing means is fixed to the side of the body opposite of the holding arm. In use, the portable locking device is mounted on a tightened load binder with the pin extending through a chain link or other opening. The securing means is then wrapped around the outside of the load binder with the loose end thereof passed over and looped onto the holding arm. The hasp of a padlock or other locking means is then inserted through a hasp hole in the holding arm and locked to thereby hold the securing means on the arm. In this manner, the securing means wrapped around the chain binder will be fixed at both ends to the main body to lock the handle of the chain binder in the tightened position.

If desired, the portable locking device of the present invention may also be used to lock any chain or chain binder to a pole or a post, as on a truck. This is accomplished by inserting the pin through at least one of the chain links of the chain or into an opening in the chain binder, and wrapping the securing means of the locking device around the chain to be locked to the pole. The free end of the securing means is locked in position on the holding arm to thereby bind the chain to the pole.

BRIEF DESCRIPTION OF THE DRAWINGS

The above and other features of the invention will be better understood from the following detailed description of the preferred embodiment illustrated in the accompanying drawing in which.

DESCRIPTION OF THE PREFERRED EMBODIMENT

Figure 2:
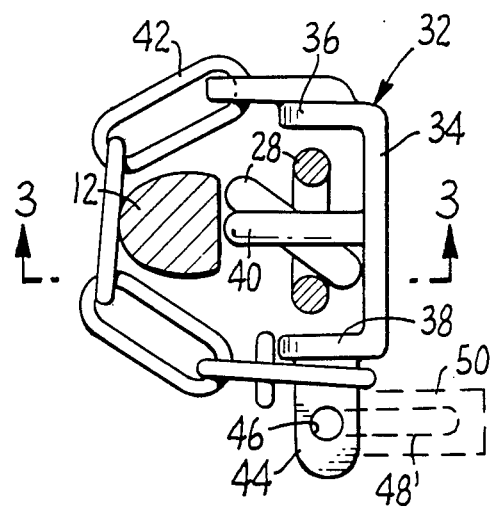
FIG. 2 is an enlarged sectional view taken along the line 2—2 of FIG. 1 with the chain binder in the closed or tightened position and the portable chain lock wrapped around and secured to the chain binder.

Referring now to the drawings wherein like numerals indicate like parts throughout the several figures, numeral 10 generally indicates a chain binder of known construction and operation, generally described below.

Chain binder 10 comprises an upper or first half having a rigid handle 12, pivoted at one end around a bolt or the like 14, and having a hook 16 pivotally attached at pivot point 18, in a known manner, via a chain link 20, an eye bolt 22 and a bar 24.

Figure 1:
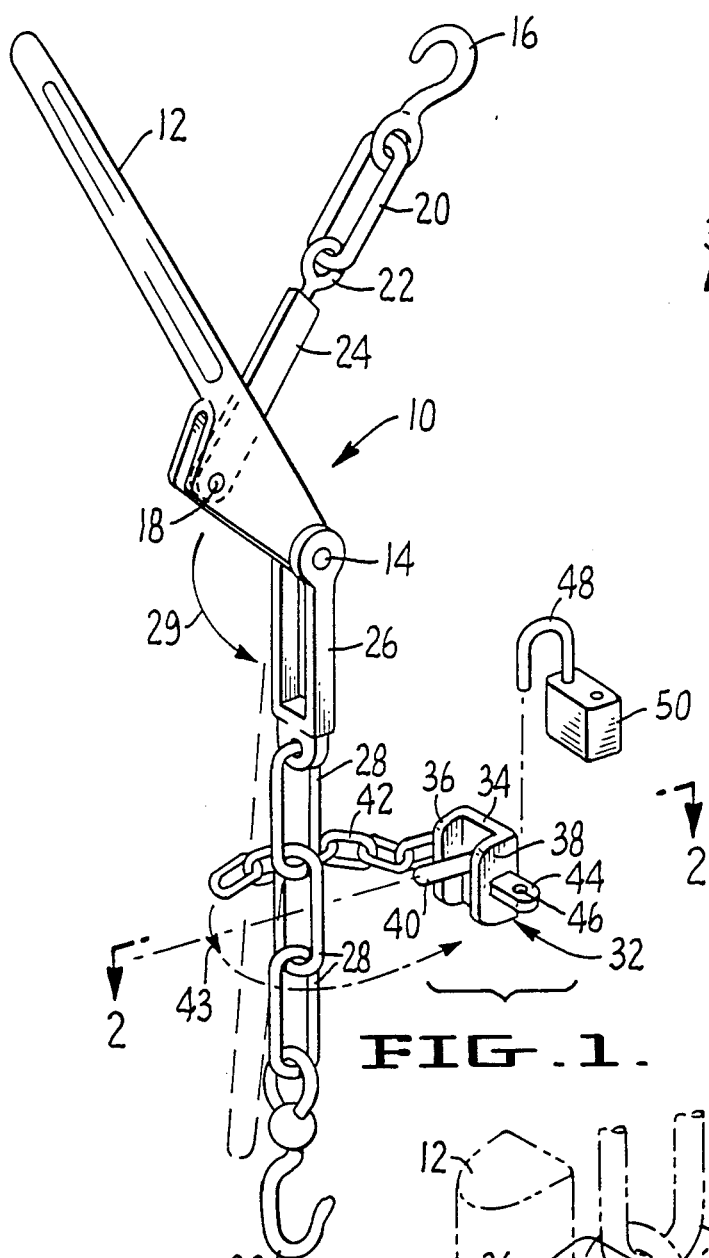
FIG. 1 is an isometric view of a typical chain binder in the open position showing the portable chain lock of the present invention poised to be wrapped around the chain binder and an open padlock with the hasp ready to be inserted in the portable chain lock.
Figure 3:
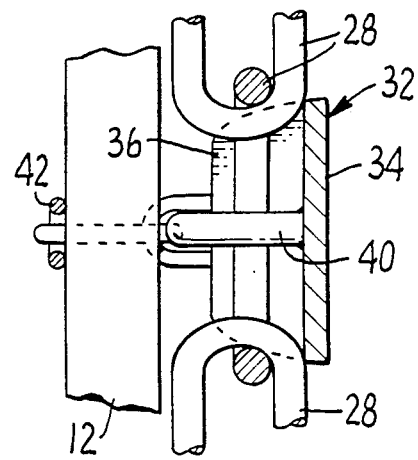
FIG. 3 is a sectional view taken along the line 3—3 of FIG. 2.

Pivot bolt 14 passes through a pair of openings formed at one end of a lower or second half, such as u-shaped member 26. The pivot point 18, on handle 12 is capable of being folded into the u-shaped member 26 when handle 12 is moved in the direction of the arrow to the closed or tightened position. The other or lower end of the u-shaped member is connected to chain links 28 or some other type of connecting means to enable a further hook 30 to be connected thereto. In this manner, when the handle 12 is moved in the direction of the arrow 29 to its closed or tightened position, as shown in broken line in FIG. 1, the two hooked ends 16, 30 will be brought together in a known manner. Therefore, the ends of a chain or chain passed over a load and hooked onto the respective hooked ends 16, 30 will be tightened to hold the load in place.

To provide both safety and security for the chain binder, a portable chain lock 32, in accordance with the present invention, is wrapped around and locked in place around the upper and lower halves of the chain binder.

Chain lock 32 comprises an open u-shaped body or channel member having a bottom wall 34, and two sidewalls 36, 38 fixed to the bottom wall. An extending finger or pin 40 is permanently fixed to the bottom wall 34, as by riveting or welding, in a central position, midway between the two sidewalls 36, 28. The pin may be of any desired length, depending on the chain binders with which it is to be used, but preferably extends from the bottom wall of the u-shaped body member out past the sidewalls 36, 38 a distance sufficient to enable it to prevent the body from being moved when the portable chain lock is in its securing or binding position.

In use, the pin 40 passes through one of the links 38 or another opening formed in the lower half of the chain binder. However, in certain chain binders, pin 40 may be inserted in an opening formed in or adjacent to the handle on the first half. When the pin is passed through the hole or opening, the bottom wall of the u-shaped body is brought up tight against the chain, handle or other member, and a flexible binding or securing means, such as a steel cable or locking chain 42 is wrapped around the chain binder, in the direction of the arrow 43 shown in FIG. 1.

Depending on the thickness of the various components of the chain binder, or a pole or the like about which it is to be wrapped, the securing means may be a cable of predetermined length, or a locking chain having six (6) links as shown in the drawing. As required, the securing means may be modified to be a cable of any desired length, or a locking chain having any number of links.

Figure 4:
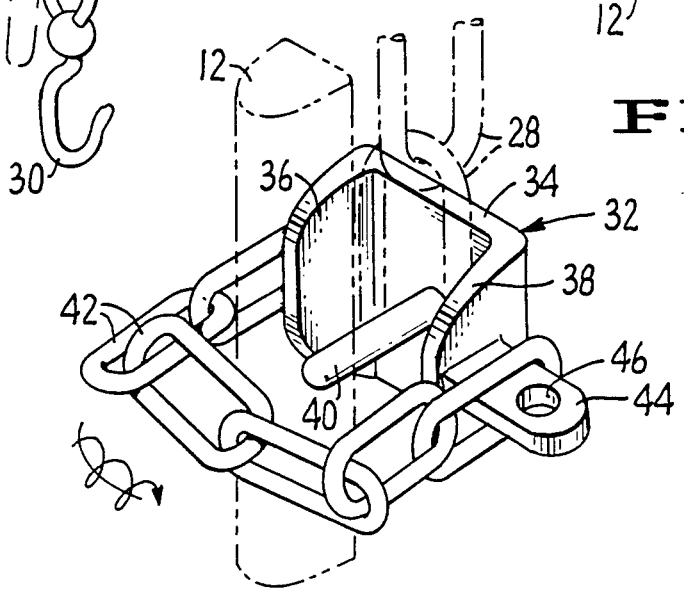
FIG. 4 shows an isometric view of the portable chain lock of the present invention wrapped around the two halves of a chain binder or a pole, with the locking chain twisted so that its last link is looped over the holding arm.

In the preferred embodiment shown, the six link locking chain will tightly fit around most conventional chain binders by looping the fifth link over a holding arm 44, as shown in FIG. 4.

The first or beginning link of the locking chain 42 is fixed to the outside of sidewall 36, as by welding, and the holding arm 44 is fixed opposite thereto on the outside of sidewall 38 in a similar manner.

Holding arm 44 is provided with an opening 46 extending therethrough to enable the hasp 48 of a padlock 50 to be inserted therein and locked to hold the link of the locking chain looped on the holding arm in place. In the locked position, the padlock will keep the locking chain 42 tightly wrapped around the chain binder 10 and prevent the pin 40 from being moved, to thereby secure the chain binder 10 in the closed or chain tightened position.

In addition to its use to lock a chain binder 10 in the tightened position, the portable chain lock of the present invention may also be used to bind a chain, or opened chain binder to a pole or post, such as found in some flat bed trucks. The portable chain lock would operate in the same manner as described above, but could not prevent the chain or chain binder from being slid up or down the pole to which it was fastened. Therefore, to prevent theft of a chain or a chain binder bound to a pole with the portable chain lock of the present invention, the pole would have to be secured at both its ends, or contain cap means or the like which would prevent the portable chain lock and fastened chain from being slipped off the pole.

In summary, the portable chain lock of the present inven-tion is preferably used to hold and lock any chain binder in its load tightened position. This is done by inserting the pin 40 of the lock into a chain link or other opening in a tightened chain binder, tightly wrapping the locking chain around the chain binder handle or second half, looping the necessary link to ensure tightness of the locking chain over the holding arm, and inserting in and locking a padlock to the opening 46 in the holding arm. With the portable chain lock 32 in the locked position around the chain binder 10, the pin 40 held in the chain link 28 or other opening will prevent the entire chain lock from being moved in any direction, therefore ensuring the integrity and security of the tightened chain binder While the invention has been described in considerable detail, it is not to be limited to such details as have been set forth except as may be necessitated by the appended claims.

What is claimed is:

1. In combination with a chain binder having two halves in the chain tightened position, a portable chain lock adapted to secure said chain binder in the chain tightened position, said chain lock comprising a U-shaped body having a bottom wall and two sidewalls fixed to said bottom wall, said sidewalls having inside and outside surfaces, a pin fixed to said bottom wall between said inside surfaces of said sidewalls, said pin inserted into and held in an opening on one half of said chain binder, a flexible locking chain having two ends, one end fixed to the outside surface of a first of said sidewalls and the other end wrapped around said chain binder and looped over a holding arm fixed to the outside surface of a second of said sidewalls, said holding arm having an opening therein adapted to receive a hasp of a padlock, whereby when said padlock is locked in said opening in said holding arm, said chain lock will be locked in position around said chain binder to prevent opening thereof.

* * * * *